United States Patent
Newcomb et al.

(10) Patent No.: US 10,618,483 B2
(45) Date of Patent: Apr. 14, 2020

(54) MULTI-COMPONENT COMPOSITE ENERGY-ABSORBING STRUCTURE HAVING A CORRUGATED JOINT

(71) Applicant: GM GLOBAL TECHNOLOGY OPERATIONS LLC, Detroit, MI (US)

(72) Inventors: Bradley A. Newcomb, Troy, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 15/885,357

(22) Filed: Jan. 31, 2018

(65) Prior Publication Data
US 2019/0232903 A1 Aug. 1, 2019

(51) Int. Cl.
*B60R 19/03* (2006.01)
*B60R 19/26* (2006.01)
(Continued)

(52) U.S. Cl.
CPC ............ *B60R 19/03* (2013.01); *B29C 65/483* (2013.01); *B29C 66/524* (2013.01);
(Continued)

(58) Field of Classification Search
CPC ......... B60R 19/03; B60R 19/26; B60R 19/34; B60R 19/04; B60R 19/12;
(Continued)

(56) References Cited

U.S. PATENT DOCUMENTS 4,227,593 A * 10/1980 Bricmont ................ F16F 7/121
188/377
4,597,601 A * 7/1986 Manning ................ B60R 19/18
293/122

(Continued)

FOREIGN PATENT DOCUMENTS

CN 110091821 A 8/2019
DE 102019101779 A1 8/2019
(Continued)

OTHER PUBLICATIONS

Computer translation of WO 2016/113477 (Year: 2016).*
(Continued)

*Primary Examiner* — Gregory A Blankenship
(74) *Attorney, Agent, or Firm* — Harness, Dickey & Pierce, P.L.C.

(57) ABSTRACT

An energy-absorbing assembly includes a first component and a second component. The first component includes a first polymer and a first plurality of reinforcing fibers. The first component includes a first peripheral wall defining a first interior compartment. A first interior portion of the first peripheral wall includes a first corrugated surface. A second component includes a second polymer and a second plurality of reinforcing fibers. The second component includes a second peripheral wall. A second interior portion of the second peripheral wall includes a second corrugated surface. The first corrugated surface is complementary to the second corrugated surface. The first corrugated surface is joined to the second corrugated surface.

20 Claims, 5 Drawing Sheets

(51) Int. Cl.
    *B60R 19/34*       (2006.01)
    *B29C 65/48*       (2006.01)
    *B29C 65/00*       (2006.01)
    *B60R 19/02*       (2006.01)
    *B29L 31/30*       (2006.01)

(52) U.S. Cl.
    CPC .......... *B29C 66/721* (2013.01); *B60R 19/023* (2013.01); *B60R 19/34* (2013.01); *B29L 2031/3044* (2013.01)

(58) Field of Classification Search
    CPC ...... B60R 2019/262; B60R 2019/1853; B29C 65/483; B29C 66/524; B29C 66/721
    USPC ......... 296/187.03, 187.09, 209, 205, 193.05; 293/102, 132, 133
    See application file for complete search history.

(56) References Cited

U.S. PATENT DOCUMENTS

| | | | | |
|---|---|---|---|---|
| 5,340,178 | A * | 8/1994 | Stewart | B60R 19/18 293/122 |
| 5,839,777 | A * | 11/1998 | Vlahovic | B21D 39/04 296/205 |
| 6,022,070 | A * | 2/2000 | Ashina | B62D 23/005 296/205 |
| 7,819,462 | B1 | 10/2010 | Owens | |
| 8,033,592 | B2 | 10/2011 | Hsu et al. | |
| 8,109,492 | B2 | 2/2012 | Winocur | |
| 8,308,227 | B2 * | 11/2012 | Tsuruta | B62D 21/157 296/209 |
| 8,961,724 | B2 | 2/2015 | Polewarczyk et al. | |
| 9,227,673 | B2 | 1/2016 | Berger et al. | |
| 2006/0202493 | A1 * | 9/2006 | Tamura | F16F 7/12 293/133 |
| 2007/0176442 | A1 * | 8/2007 | Mori | B60R 19/34 293/133 |
| 2008/0203768 | A1 * | 8/2008 | Lowe | B62D 25/00 296/205 |
| 2008/0217934 | A1 * | 9/2008 | Hori | B60R 19/18 293/102 |
| 2009/0102234 | A1 * | 4/2009 | Heatherington | B21D 22/025 296/187.03 |
| 2012/0104775 | A1 * | 5/2012 | Marur | B60R 19/18 293/120 |
| 2012/0139273 | A1 * | 6/2012 | Jeong | B60R 19/34 293/132 |
| 2013/0001964 | A1 * | 1/2013 | Freundl | B60R 19/18 293/133 |
| 2014/0084634 | A1 * | 3/2014 | Suzuki | B62D 25/082 296/205 |
| 2015/0343972 | A1 * | 12/2015 | Lee | B60R 19/34 293/133 |
| 2016/0129866 | A1 * | 5/2016 | Kamiya | B60R 19/023 293/133 |
| 2016/0264082 | A1 | 9/2016 | Berger et al. | |
| 2017/0106824 | A1 * | 4/2017 | Schiller | B60R 19/34 |
| 2017/0327066 | A1 * | 11/2017 | Lakic | B60R 19/34 |
| 2018/0022392 | A1 * | 1/2018 | Leroy | B62D 25/025 296/209 |
| 2018/0281710 | A1 * | 10/2018 | Lindblom | B60R 19/18 |
| 2019/0039541 | A1 * | 2/2019 | Tyan | F16F 7/121 |
| 2019/0111872 | A1 | 4/2019 | Newcomb et al. | |
| 2019/0135211 | A1 * | 5/2019 | Ikuta | B23K 26/0006 |
| 2019/0232903 | A1 * | 8/2019 | Newcomb | B29C 65/483 |
| 2019/0264769 | A1 * | 8/2019 | Gergely | F16F 7/124 |

FOREIGN PATENT DOCUMENTS

| | | | | |
|---|---|---|---|---|
| WO | WO 2007/093701 | * | 8/2007 | ............ B60R 19/34 |
| WO | WO 2016/113477 | * | 7/2016 | ............ B60R 19/18 |

OTHER PUBLICATIONS

Newcomb et al.; U.S. Appl. No. 15/782,307, filed Oct. 12, 2017 entitled "Fiber-Reinforced Composite Bumper Beam and Crush Members"; 57 pages.

* cited by examiner

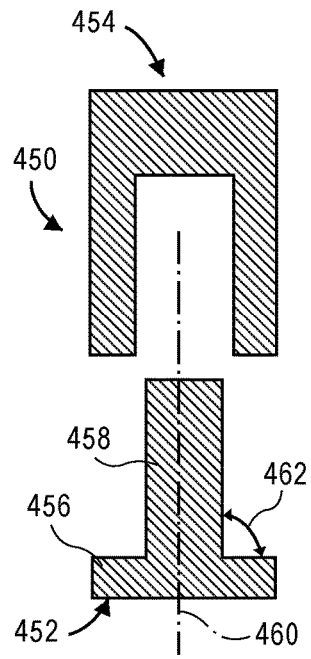 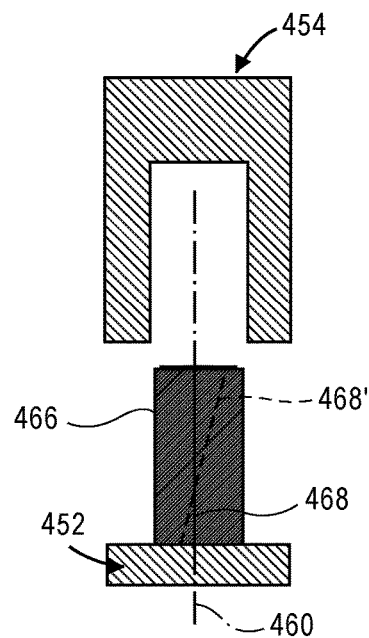 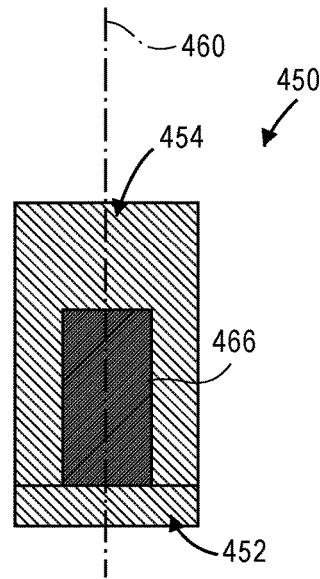
FIG. 9A   FIG. 9B   FIG. 9C
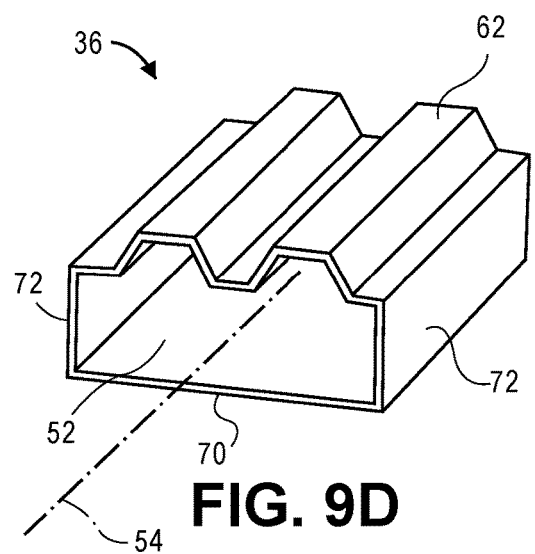 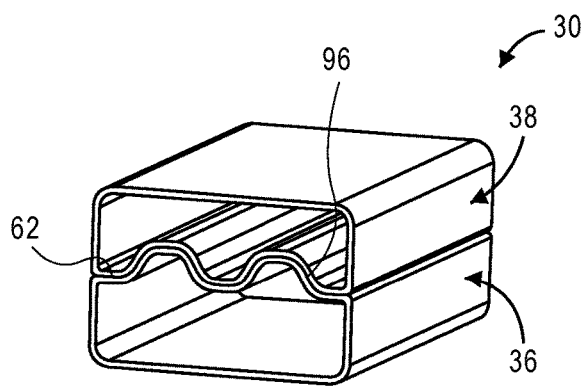
FIG. 9D   FIG. 9E

MULTI-COMPONENT COMPOSITE ENERGY-ABSORBING STRUCTURE HAVING A CORRUGATED JOINT

INTRODUCTION

The present disclosure relates to a hollow, corrugated crush box.

This section provides background information related to the present disclosure which is not necessarily prior art.

It is advantageous to improve crush performance of vehicle components. However, it is also advantageous that components of automobiles or other vehicles be lightweight to improve fuel efficiency. Thus, vehicle components that exhibit both adequate strength during normal service and energy-absorption characteristics under extraordinary conditions such as collisions, while minimizing component weight are advantageous.

SUMMARY

This section provides a general summary of the disclosure, and is not a comprehensive disclosure of its full scope or all of its features.

The present disclosure provides in certain aspects an energy-absorbing assembly for a vehicle. The energy-absorbing assembly includes a first component and a second component. The first component includes a first polymer and a first plurality of reinforcing fibers. The first component includes a first peripheral wall defining a first interior compartment. The first interior compartment has a first longitudinal axis extending therethrough. A first interior portion of the first peripheral wall includes a first plurality of elongate ridges formed therein. Each respective elongate ridge of the first plurality of elongate ridges extends substantially parallel to the first longitudinal axis and is spaced apart from adjacent elongate ridges of the first plurality of elongate ridges at predetermined intervals to form a first corrugated surface. A second component includes a second polymer and a second plurality of reinforcing fibers. The second component includes a second peripheral wall. The second peripheral wall defines a second interior compartment having a second longitudinal axis extending therethrough. A second interior portion of the second peripheral wall includes a second plurality of elongate ridges formed therein. Each respective elongate ridge of the second plurality of elongate ridges extends substantially parallel to the second longitudinal axis and is spaced apart from adjacent elongate ridges of the second plurality of elongate ridges at predetermined intervals to form a second corrugated surface. The first corrugated surface is complementary to the second corrugated surface. The first corrugated surface is joined to the second corrugated surface.

In one aspect, the first peripheral wall further includes a first exterior wall and a first interior wall. The first interior wall includes the first interior portion. The second peripheral wall further includes a second exterior wall and a second interior wall. The second interior wall includes the second interior portion. The first exterior wall and the second exterior wall cooperate to define an elongated tube. The first interior wall and the second interior wall cooperate to define a transverse plate. The transverse plate extends through the elongated tube substantially parallel to the first longitudinal axis and the second longitudinal axis.

In one aspect, the energy-absorbing assembly also includes an adhesive layer disposed between the first corrugated surface and the second corrugated surface to fix the first component to the second component.

In one aspect, the first plurality of elongate ridges and the second plurality of elongate ridges each have a generally periodic profile.

In one aspect, the first interior portion of the first peripheral wall has a first length in a direction substantially parallel the first longitudinal axis. A first exterior portion of the first peripheral wall has a second length in the direction. The second length is greater than the first length. The second interior portion of the second peripheral wall has the first length in the direction. A second exterior portion of the second peripheral wall has the second length in the direction.

In one aspect, the first peripheral wall includes a first outer wall, first opposing side walls extending substantially perpendicular to the first outer wall, and a first inner wall. The first inner wall includes the first interior portion of the first peripheral wall. The first inner wall is disposed opposite the first outer wall. The first inner wall extends between the first opposing side walls. The second peripheral wall includes a second outer wall, second opposing side walls extending substantially perpendicular to the second outer wall, and a second inner wall. The second inner wall includes the second interior portion of the second peripheral wall. The second inner wall is disposed opposite the second outer wall. The second inner wall extends between the second opposing side walls. The first outer wall, the first opposing side walls, the second outer wall, and the second opposing side walls cooperate to define a substantially rectangular cross section in a direction substantially perpendicular to the first longitudinal axis and the second longitudinal axis.

In one aspect, the first polymer and the second polymer are thermoset polymers. The thermoset polymers are independently selected from the group consisting of: benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-polymers thereof, and combinations thereof.

In one aspect, the first polymer and the second polymer are thermoplastic polymers. The thermoplastic polymers are independently selected from the group consisting of: polyethylenimine (PEI), polyamide-imide (PAI), polyamide (PA) (e.g., nylon 6, nylon 66, nylon 12), polyetheretherketone (PEEK), polyetherketone (PEK), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), polycarbonate (PC), polyaryletherketone (PAEK), polyetherketoneketone (PEKK), co-polymers thereof, and combinations thereof.

In one aspect, the first plurality of reinforcing fibers and the second plurality of reinforcing fibers are independently selected from the group consisting of: carbon fibers, glass fibers, basalt fibers, para-aramid fibers, meta-aramid fibers, polyethylene fibers, and natural fibers.

In one aspect, a first plurality of floors is disposed between the first plurality of elongate ridges. A second plurality of floors is disposed between the second plurality of elongate ridges. A plane extends substantially perpendicular to the first plurality of floors and the second plurality of floors. Each elongate ridge of the first plurality of elongate ridges and each elongate ridge of the second plurality of elongate ridges includes a top wall and two side walls. A corrugation angle is formed between the plane and each side wall. The corrugation angle is greater than or equal to about 30° and less than or equal to about 70°.

In one aspect, the first peripheral wall has a first thickness of greater than or equal to about 1 mm and less than or equal to about 8 mm. The second peripheral wall has a second thickness of greater than or equal to about 1 mm and less than or equal to about 8 mm.

In one aspect, a first of ratio of a first height to the first thickness of the elongate ridges of the first plurality of elongate ridges is greater than or equal to about 1 and less than or equal to about 20. A second ratio of a second height to the second thickness of the elongate ridges of the second plurality of elongate ridges is greater than or equal to about 1 and less than or equal to about 20.

In one aspect, the energy-absorbing assembly also includes a third component. The third component includes a third polymer and a third plurality of reinforcing fibers. The third component includes a third peripheral wall defining a third interior compartment having a third longitudinal axis extending therethrough, a third interior portion of the third peripheral wall including a third plurality of elongate ridges formed therein. Each respective elongate ridge of the third plurality of elongate ridges extends substantially parallel to the third longitudinal axis and is spaced apart from adjacent elongate ridges of the third plurality of elongate ridges at predetermined intervals to form a third corrugated surface. At least one of the first component and the second component includes a fourth corrugated surface. The third corrugated surface is complementary to the fourth corrugated surface. The third corrugated surface is joined to the fourth corrugated surface.

In one aspect, the energy-absorbing assembly is selected from the group consisting of: a pillar, a structural panel, a suspension component, a crush can, a bumper beam, a structural front rail, a structural frame, a cross car beam, an undercarriage component, and combinations thereof.

In one aspect, the first polymer and the second polymer are the same.

The present disclosure provides in other aspects, crush member for a bumper beam assembly. The crush member includes a first component, a second component, and adhesive. The first component includes a polymer and a first plurality of discontinuous chopped reinforcing fibers. The first component includes a first peripheral wall defining a first interior compartment having a first longitudinal axis extending therethrough. A first interior portion of the first peripheral wall includes a first plurality of elongate ridges formed therein. Each respective elongate ridge of the first plurality of elongate ridges extends substantially parallel to the first longitudinal axis and is spaced apart from adjacent elongate ridges of the first plurality of elongate ridges at predetermined intervals to form a first corrugated surface. The second component includes the polymer and a second plurality of discontinuous chopped reinforcing fibers. The second component includes a second peripheral wall defining a second interior compartment having a second longitudinal axis extending therethrough. A second interior portion of the second peripheral wall includes a second plurality of elongate ridges formed therein, wherein each respective elongate ridge of the second plurality of elongate ridges extends substantially parallel to the second longitudinal axis and is spaced apart from adjacent elongate ridges of the second plurality of elongate ridges at predetermined intervals to form a second corrugated surface, wherein the first corrugated surface is complementary to the second corrugated surface. The adhesive is disposed between the first corrugated surface and the second corrugated surface to fix the first component to the second component.

The present disclosure provides in still other aspects a method of manufacturing an energy-absorbing assembly. The method includes forming a first component from a first composite sheet. The first composite sheet includes a first polymer resin and a first plurality of reinforcing fibers. The first component includes a first peripheral wall defining a first interior compartment having a first longitudinal axis extending therethrough. A first interior portion of the first peripheral wall includes a first plurality of elongate ridges formed therein. Each respective elongate ridge of the first plurality of elongate ridges extends substantially parallel to the first longitudinal axis and is spaced apart from adjacent elongate ridges of the first plurality of elongate ridges at predetermined intervals to form a first corrugated surface. The method further includes forming a second component from a second composite sheet. The second composite sheet includes a second polymer resin and a second plurality of reinforcing fibers. The second component includes a second peripheral wall defining a second interior compartment having a second longitudinal axis extending therethrough. A second interior portion of the second peripheral wall includes a second plurality of elongate ridges formed therein. Each respective elongate ridge of the second plurality of elongate ridges extends substantially parallel to the second longitudinal axis and is spaced apart from adjacent elongate ridges of the second plurality of elongate ridges at predetermined intervals to form a second corrugated surface. The second corrugated surface is complementary to the first corrugated surface. The method further includes joining the first corrugated surface to the second corrugated surface to form the energy-absorbing assembly.

In one aspect, the joining the first corrugated surface to the second corrugated surface includes applying adhesive to at least one of the first corrugated surface and the second corrugated surface. The method further includes curing the adhesive.

In one aspect, the forming the first component includes compression molding the first component. The compression molding the first component includes wrapping the first composite sheet around a first male mold. The first male mold includes a first mold surface and a second mold surface opposite the first mold surface. The first male mole defines the first plurality of elongate ridges A first seam of the first composite sheet is disposed on the first mold surface. The forming the second component includes compression molding the second component. The compression molding the second component includes wrapping the second composite sheet around a second male mold. The second male mold includes a third mold surface and a fourth mold surface opposite the third mold surface. The second male mold defines the second plurality of elongate ridges. A second seam of the second composite sheet is disposed on the third mold surface.

In one aspect, the first seam of the first composite sheet extends non-parallel to the first longitudinal axis. The second seam of the second composite sheet extends non-parallel to the second longitudinal axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 8:
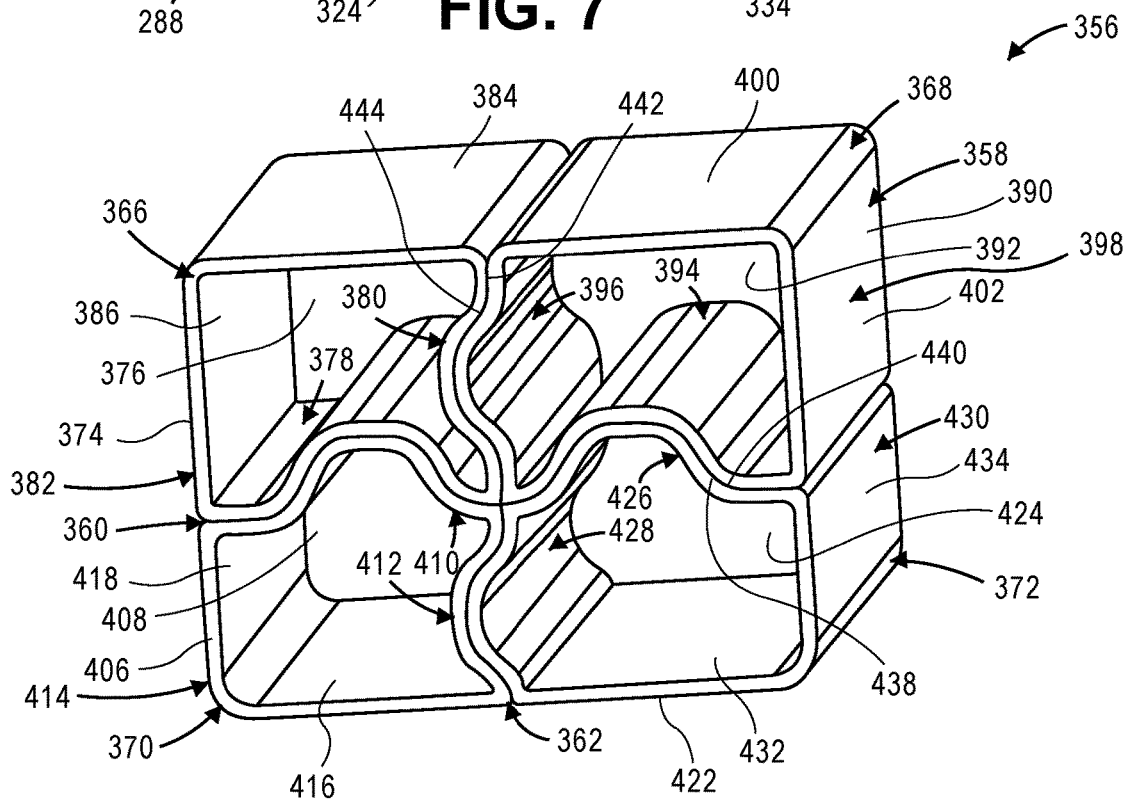

FIG. 8 is a perspective view of yet another energy-absorbing assembly having four components according to certain aspects of the present disclosure; and FIGS. 9A-9E show a compression molding process for manufacturing an energy-absorbing assembly according to certain aspects of the present disclosure; FIG. 9A shows a mold; FIG. 9B shows a composite precursor sheet disposed around a portion of the mold; FIG. 9C shows the mold closed around the composite precursor sheet; FIG. 9D shows a first component formed from the composite preform; and FIG. 9E shows the first component joined to a second component to form the energy-absorbing assembly.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Energy-absorbing assemblies (or crush assemblies) are used in vehicles to absorb collision energy through controlled deformation. Energy-absorbing assemblies may include crush members, such as crush cans or boxes, attached to a bumper. A crush member may include an outer or peripheral wall extending along a longitudinal axis, and a hollow interior. The crush member may also include internal structural geometry for reinforcement, such as a transverse plate. The amount of energy absorbed by a crush member is a function of the material and the geometry of the structure under crush load.

Crush members may be constructed from fiber-reinforced composite or metal, such as aluminum or steel. Fiber-reinforced composite materials include a polymeric matrix having a reinforcing material distributed therein. Suitable reinforcing materials include carbon fibers, glass fibers (e.g., fiber glass, quartz), basalt fibers, aramid fibers (e.g., KEVLAR®, polyphenylene benzobisoxazole (PBO)) polyethylene fibers (e.g., high-strength ultra-high molecular weight (UHMW) polyethylene), polypropylene fibers (e.g., high-strength polypropylene), natural fibers (e.g., cotton, flax, cellulose, spider silk), and combinations thereof, by way of non-limiting example. The reinforcing materials may be fabricated as woven fabric, continuous random fabric, discontinuous random fibers, chopped random fabric, continuous strand unidirectional plies, oriented chopped strand plies, braided fabric and any combinations thereof. The polymeric matrix may be a thermoplastic polymer or a thermoset polymer.

Crush members are designed to absorb energy in a crash. Metal crush members absorb energy as molecules slide past one another to deform the component without fracturing. Fiber-reinforced composite crush members absorb energy through fragmentation, pulverization, fronding, tearing, interlaminar, intralaminar, fiber-matrix debonding, and fiber pullout failure modes, by way of non-limiting example. However, components of multi-component crush members can potentially separate from one another in a collision, particularly when the energy-absorbing assembly is impacted at an angle that is non-parallel to the longitudinal axis of the crush member (i.e., the collision is not head on). The separation of a component from the multi-component crush assembly may be referred to as peeling or interface failure in the case of adhesively-bonded joints. Thus, in the case of a composite crush member, the components of the crush member may break away from the path of impact prior to the crush member absorbing energy or prior to the crush member absorbing a maximum amount of energy possible based on the material and geometry of the crush member, thereby reducing the overall energy absorption of the assembly.

Fiber-reinforced composite crush members are lighter weight than metal crush members. Such lighter weight crush members may improve vehicle fuel efficiency. However, there is a need for a fiber-reinforced crush assembly that exhibits improved energy-absorbing capacity and minimizes or avoids interface failure of the components of the crush member from the one another during crush.

Figure 1:
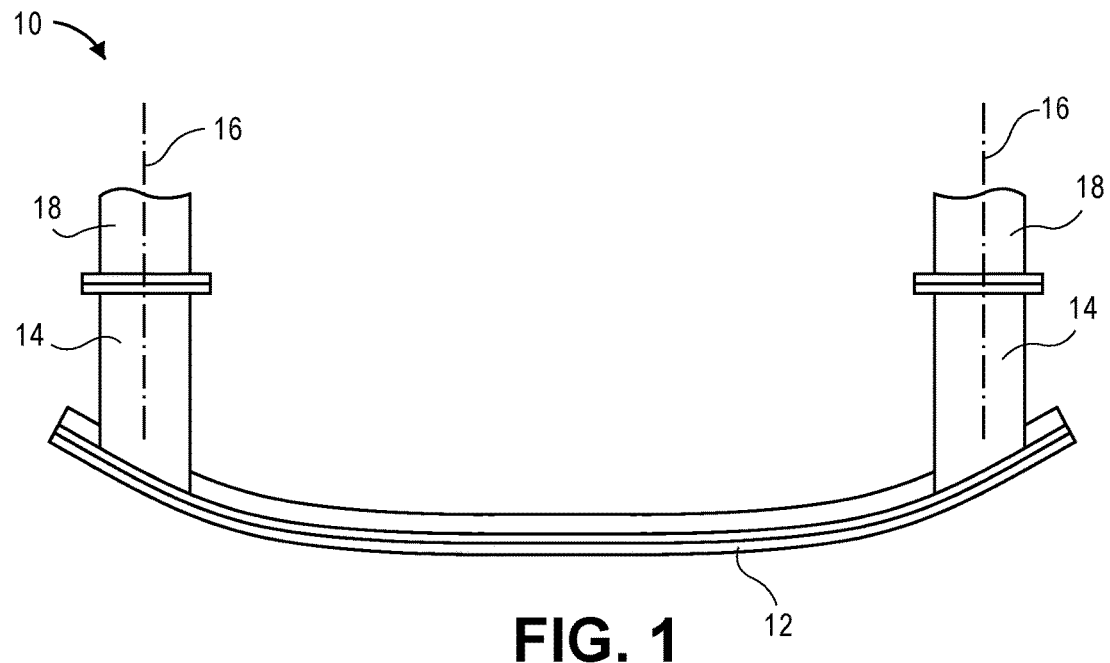
FIG. 1 shows an exemplary energy-absorbing assembly for a vehicle including a bumper beam and two crush members.

Referring to FIG. 1, an example bumper assembly 10 for a vehicle is provided. The bumper assembly 10 includes a bumper beam 12 and two crush members (e.g., crush cans or boxes) 14. Each of the crush members 14 extends along a longitudinal axis 16. The crush members 14 may be attached to respective vehicle rails 18. The bumper assembly 10 may also include other elements such as decorative fascia (not shown).

In various aspects, the present disclosure provides an energy-absorbing assembly having improved resistance to interface failure (e.g., bondline failure of the adhesive and adherend). The energy-absorbing assembly includes at least two components, such as a first component and a second component. Each component includes an exterior portion and an interior portion defining a corrugated surface. The respective corrugated surfaces of the components complement one another and the components are joined at the corrugated surfaces. The exterior portions of the two components cooperate to define a hollow, elongated tube. The interior portions of the two components cooperate to define a transverse plate extending through the elongated tube. The corrugated surfaces engage one another during crush to form a mechanical interlock for the suppression of the failure at the adhesive/adherend interface.

Figure 2:
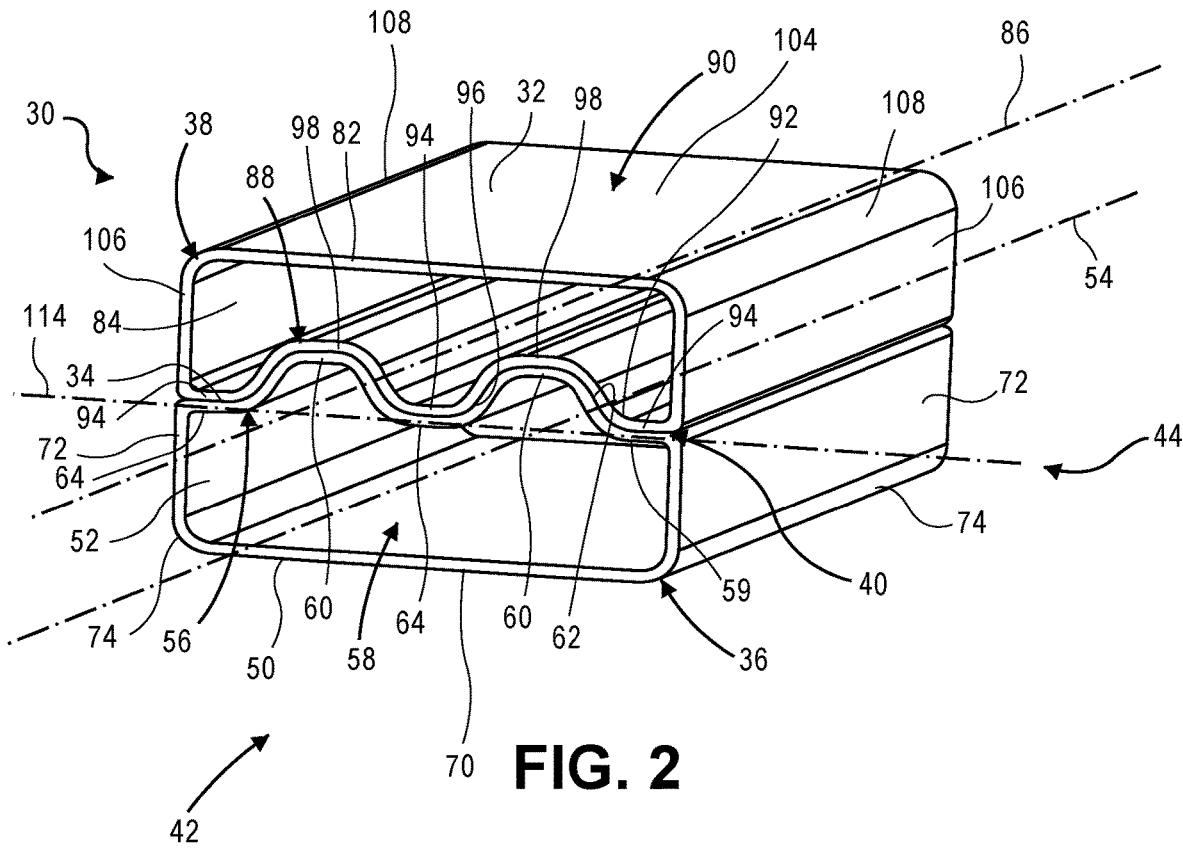
FIG. 2 is a perspective view of an energy-absorbing assembly according to certain aspects of the present disclosure.

With reference to FIG. 2, an energy-absorbing assembly 30 according to certain aspects of the present disclosure is provided. The energy-absorbing assembly 30 may have an elongated structure that generally includes a hollow, elongated tube 32 and a transverse plate 34 extending through the elongated tube 32. As used herein, the term tube may refer to a structure that extends along a longitudinal axis and has a peripheral wall that extends in a direction substantially parallel to the longitudinal axis. The peripheral wall may be fully enclosed to define a hollow interior. Ends of the elongated tube in a direction perpendicular to the longitudinal axis may be open or closed. A cross section of the peripheral wall may define a variety of shapes in a direction perpendicular to the longitudinal axis. By way of non-limiting example, the peripheral wall of the elongated tube may have cross section that is circular (see, e.g., FIG. 5), elliptical, rectangular (see, e.g., FIGS. 2, 4, 6-8), square, or hexagonal.

The energy-absorbing assembly 30 may include a first component 36 and a second component 38. The first component 36 and the second component 38 may be assembled to one another at a joint 40. As will be described in greater detail below, the first component 36 and the second component 38 may both be formed from or include polymeric composites. Each of the first and second components 36, 38 may be integrally formed (i.e., the first and second components 36, 38 may each include a unitary body that is free of joints). The energy-absorbing assembly 30 may extend between a first end 42 and a second end 44 opposite the first end. By way of non-limiting example, when the energy-absorbing assembly 30 is a crush member for a bumper beam assembly of vehicle, one of the first end 42 and the second end 44 may be connected to a bumper (see, e.g., bumper 12 of FIG. 1) and the other of the first end 42 and the second end 44 may be connected to a vehicle rail (see, e.g., vehicle rail 18 of FIG. 1).

The first component 36 may include a first peripheral wall 50. The first peripheral wall 50 may define a first interior compartment or cell 52. A first longitudinal axis 54 may extend through the first interior compartment 52. The first peripheral wall 50 may extend substantially parallel to the first longitudinal axis 54. The first peripheral wall 50 may extend around an entire perimeter of the first component 36. The first peripheral wall 50 may include a first interior portion 56 and a first exterior portion 58. In various aspects, the first exterior portion 58 may be referred to as a first exterior wall.

The first interior portion 56 of the first peripheral wall 50 may define a portion of the transverse plate 34. The first interior portion 56 may include a first inner wall 59 defining a first plurality of elongate ridges or peaks 60. Each elongate ridge 60 may extend substantially parallel to the first longitudinal axis 54. Each elongate ridge 60 may be spaced apart from other elongate ridges 60 of the first plurality at predetermined intervals to form a first corrugated surface 62. A first plurality of elongate floors or valleys 64 may be disposed between the plurality of elongate ridges 60 such that the ridges 60 and floors 64 alternate with one another. The ridges 60 may project away from the first interior compartment 52 in a direction substantially perpendicular to the first longitudinal axis 54. In various aspects, the elongate ridges 60 may have a generally periodic profile such that they repeat at regular, predetermined intervals. In various aspects, the elongate ridges 60 and the elongate floors 64 may define a waveform shape. However, in various alternative aspects, the elongate ridges 60 may repeat at irregular intervals.

The first exterior portion 58 of the first peripheral wall 50 may define a portion of the elongated tube 32. The first peripheral wall 50 may include a first outer wall 70 and opposing first side walls 72 extending substantially perpendicular to the first outer wall 70. A first rounded corner 74 may connect each first side wall 72 to the first outer wall 70. As noted above, in alternative embodiments, the first exterior portion 58 of the first peripheral wall 50 may have a different cross-sectional geometry, such as a semi-circle, by way of non-limiting example.

The second component 38 may be similar to the first component 36. The second component 38 may include a second peripheral wall 82. The second peripheral wall 82 may define a second interior compartment or cell 84. A second longitudinal axis 86 may extend through the second interior compartment 84. The second peripheral wall 82 may extend substantially parallel to the second longitudinal axis 86. The second peripheral wall 82 may extend around an entire perimeter of the second component 38. The second peripheral wall 82 may include a second interior portion 88 and a second exterior portion 90. In various aspects, the second exterior portion 90 may be referred to as a second exterior wall.

The second interior portion 88 of the second peripheral wall 82 may define another portion of the transverse plate 34. The second interior portion 88 may include a second inner wall 92 defining a second plurality of elongate ridges or peaks 94. Each elongate ridge 94 may extend substantially parallel to the second longitudinal axis 86. Each elongate ridge 94 may be spaced apart from other elongate ridges 94 of the second plurality at predetermined intervals to form a second corrugated surface 96. The second corrugated surface 96 may be complementary to the first corrugated surface 62. A second plurality of elongate floors or valleys 98 may be disposed between the second plurality of elongate ridges 94 such that the elongate ridges 94 and elongate floors 98 alternate with one another. The ridges 94 may project away from the second interior compartment 84 in a direction substantially perpendicular to the second longitudinal axis 86. In various aspects, the elongate ridges 94 may have a generally periodic profile such that they repeat at regular, predetermined internals. In various aspects, the elongate ridges 94 and the elongate floors 98 may define a waveform shape. However, in various alternative aspects, the elongate ridges 94 may repeat at irregular intervals.

The second exterior portion 90 of the second peripheral wall 82 may define a portion of the elongated tube 32. The second peripheral wall 82 may include a second outer wall 104 and second opposing side walls 106 extending substantially perpendicular to the second outer wall 104. A second rounded corner 108 may connect each second side wall 106 to the outer wall 104. In alternative embodiments, the second exterior portion 90 of the second peripheral wall 82 may have a different cross-sectional geometry as discussed above, such as a semi-circle, by way of non-limiting example.

The first component 36 and the second component 38 may be joined to one another to form the energy-absorbing assembly 30. More specifically, the first corrugated surface 62 may be joined to the second corrugated surface 96 to form the joint 40. The first and second surfaces 62, 96 may be joined to one another, for example, by a layer of adhesive disposed between the first corrugated surface 62 and the second corrugated surface 96. The first and second longitudinal axes 54, 86 may extend substantially parallel to one another. The first interior portion 56 of the first peripheral wall 50 and the second interior portion 88 of the second peripheral wall 82 may cooperate to define the transverse plate 34. The first exterior portion 58 of the first peripheral wall 50 and the second exterior portion 90 of the second peripheral wall 82 may cooperate to define the elongated tube 32. The elongated tube 32 may define a substantially rectangular cross section in a direction parallel to the first and second longitudinal axes 54, 86.

Engagement of the first and second corrugated surfaces 62, 96 may provide a mechanical interlock to resist interface failure during crush. The mechanical interlock may reduce or prevent interface failure during impacts that are non-parallel to the first and second longitudinal axes 54, 86. For example, a side wall (see, e.g., side wall 122 of FIG. 3) of an elongate ridge 60 on the first component 36 may engage a side wall of an elongate ridge 94 on the second component 38 to prevent the first and second components 36, 38 from sliding with respect to one another along a transverse axis 114 substantially perpendicular to the first and second longitudinal axes 54, 86. In contrast, two alternative components joined at planar surfaces would not exhibit significant mechanical resistance to sliding.

The first component 36 may be formed from a first fiber-reinforced polymeric composite material and the second component 38 may be formed from a second fiber-reinforced polymeric composite material. The first composite material includes a first polymer and a first plurality of reinforcing fibers. The second composite material includes a second polymer and a second plurality of reinforcing fibers.

The first and second polymers may be thermoset polymers independently selected from the group consisting of: benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-polymers thereof, and combinations thereof. The first and second polymers may be thermoplastic polymers independently selected from the group consisting of: polyethylenimine (PEI), polyamide-imide (PAI), polyamide (PA) (e.g., nylon 6, nylon 66, nylon 12), polyetheretherketone (PEEK), polyetherketone (PEK), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), polycarbonate (PC), polyaryletherketone (PAEK), polyetherketoneketone (PEKK), co-polymers thereof, and combinations thereof. In various aspects, the first and second polymers of the respective first and second components 36, 38 may have the same composition.

The first and second pluralities of reinforcing fibers may be independently selected from the group consisting of: carbon fibers, glass fibers (e.g., fiber glass, quartz), basalt fibers, aramid fibers (e.g., KEVLAR®, polyphenylene benzobisoxazole (PBO), polyethylene fibers (e.g., ultra-high molecular weight polyethylene (UHMWPE)), polypropylene fibers (e.g., high-strength polypropylene) natural fibers (e.g., cotton, flax, cellulose, spider silk), and combinations thereof. The first and second pluralities of reinforcing fibers may be fabricated as woven fabric, continuous random fabric, discontinuous random fibers, chopped random fabric, continuous strand unidirectional plies, oriented chopped strand plies, braided fabric, flowable fibers, and combinations thereof. In various aspects, the first composite and the second composite may both include a thermoplastic polymer and a plurality of discontinuous random fibers.

Figure 3:
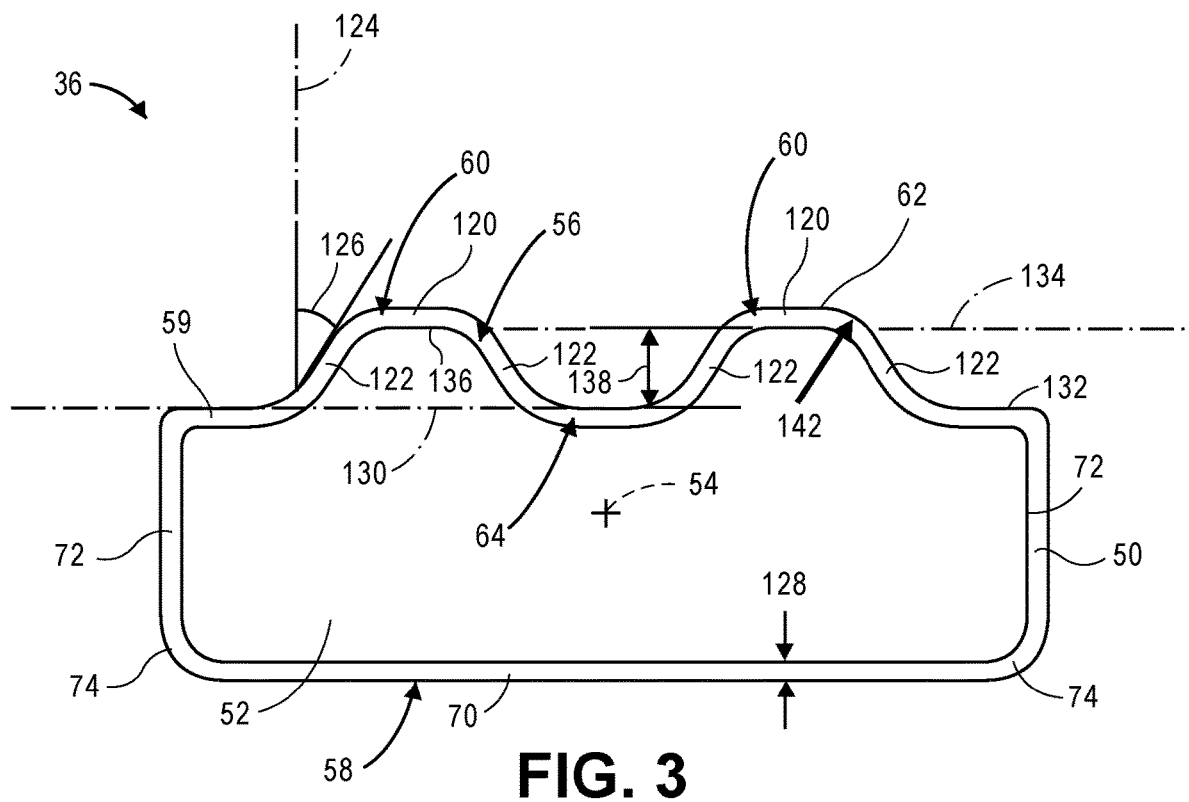
FIG. 3 is a front view of a component of the energy-absorbing assembly of FIG. 2.

Referring to FIG. 3, the first component 36 is shown. Each elongate ridge 60 may include a top wall 120 and two side walls 122. A first plane 124 may extend substantially perpendicular to the elongate floor 64 and the first longitudinal axis 54. A corrugation angle 126 may be defined between the first plane 124 and the side wall 122. The corrugation angle 126 may be dependent on the composition of the first composite. In various aspects, the corrugation angle 126 may be greater than or equal to about 1° and less than or equal to about 85°, optionally greater than or equal to about 5° and less than or equal to about 70°, optionally greater than or equal to about 30° and less than or equal to about 70°, optionally greater than or equal to about 35° and less than or equal to about 65°, optionally greater than or equal to about 40° and less than or equal to about 60°, optionally greater than or equal to about 40° and less than or equal to about 55°, optionally greater than or equal to about 40° and less than or equal to about 50°, and optionally about 45°.

The peripheral wall 50 may have a thickness 128. The thickness 128 may be constant or variable. The thickness 128 may vary along a length of the first component 36 (i.e., along the first longitudinal axis 54). In one example, the peripheral wall 50 have a thickness 128 of about 2 mm at the first end 42 of the first component 36 (e.g., where it connects to a bumper as best seen in FIG. 1) and a distinct thickness at the second end 44 of the first component 36 (e.g., where it connects to a vehicle rail as best seen in FIG. 1). The thickness 128 at the first end 42 may be about 2 mm, the thickness 128 at the second end 44 may be about 6 mm, and the thickness 128 may increase linearly between the first end 42 and the second end 44. The thickness 128 may also vary based on location on the peripheral wall 50. For example, the interior portion 56 may have a different thickness 128 than the exterior portion 58. The thickness 128 may be dependent upon the composition of the first composite. In various aspects, the thickness 128 may be greater than or equal to about 1 mm and less than or equal to about 10 mm, optionally greater than or equal to about 1 mm and less than or equal to about 9 mm, optionally greater than or equal to about 1 mm and less than or equal to about 8 mm, optionally greater than or equal to about 2 mm and less than or equal to about 8 mm, optionally greater than or equal to about 3 mm and less than or equal to about 8 mm, optionally greater than or equal to about 4 mm and less than or equal to about 7 mm, and optionally greater than or equal to about 5 mm and less than or equal to about 6 mm.

With renewed reference to FIG. 3, a floor plane 130 may be defined by outside surfaces 132 of the elongate floors 64. A ridge plane 134 may be defined by inside surfaces 136 of the elongate ridges 60. A ridge height 138 may be defined between the floor plane 130 and the ridge plane 134. In general, greater heights 138 correspond to greater suppression of interface failure because the side walls 122 have a larger surface area to form the mechanical interlock. In various aspects, the ridge height 138 may be greater than or equal to about 2 mm and less than or equal to about 60 mm, optionally be greater than or equal to about 5 mm and less than or equal to about 20 mm, optionally be greater than or equal to about 10 mm and less than or equal to about 15 mm, and optionally about 12 mm.

A ratio is defined as a quotient of ridge height 138 and thickness 128 (ridge height 138/thickness 128). In general, greater ratios correspond to greater component interlocking. In various aspects, the ratio may be greater than or equal to about 1 and less than or equal to about 20, optionally greater than or equal to about 2 and less than or equal to about 10, optionally greater than or equal to about 3 and less than or equal to about 7, and optionally about 6.

The elongate ridges 60 may also define a corner radius 142. The corner radius 142 may be dependent on the composition of the first composite. In various aspects, the corner radius 142 may be greater than or equal to 1 mm, optionally greater than or equal to about 3 mm, and optionally greater than or equal to about 6 mm.

Figure 4:
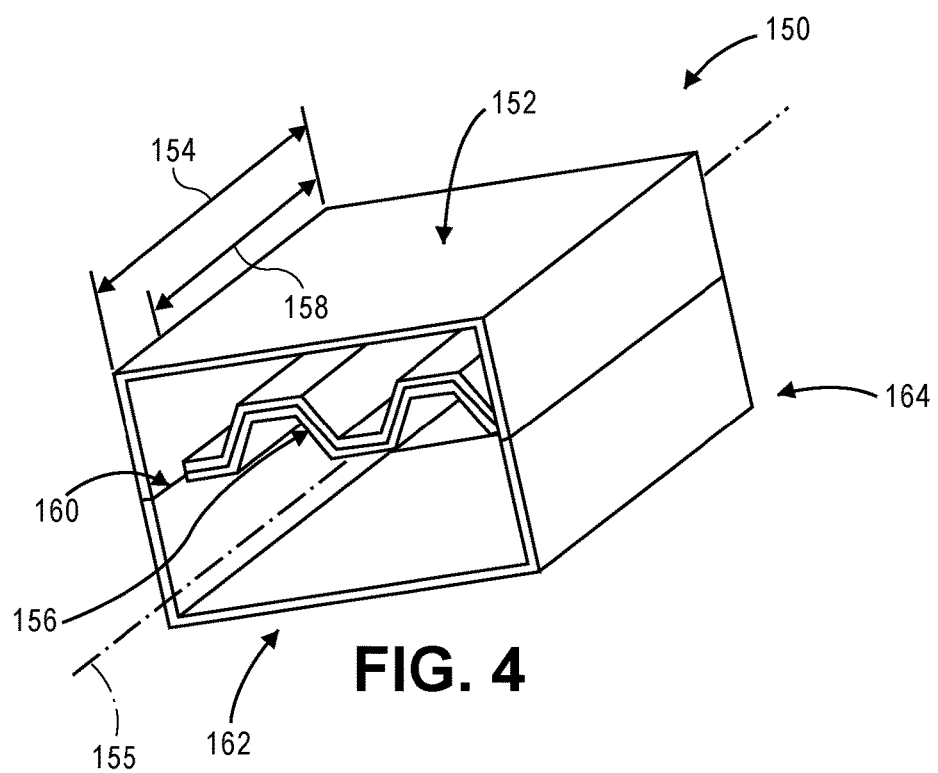
FIG. 4 is a perspective view of another energy-absorbing assembly having a shortened transverse plate according to certain aspects of the present disclosure.

With reference to FIG. 4, another energy-absorbing assembly 150 according to certain aspects of the present disclosure is provided. Except as otherwise noted, the energy-absorbing assembly 150 may be similar to the energy-absorbing assembly 30 of FIG. 2. The energy-absorbing assembly 150 may include an elongated tube 152 having a first length 154 in a direction parallel to a longitudinal axis 155 of the elongated tube 152 and a transverse plate 156 having a second length 158 in the direction. The first length 154 may be different than the second length 158. More particularly, the first length 154 may be greater than the second length 158. An open portion 160 may be defined on the elongated tube 152 where the transverse plate 156 does not extend.

The energy-absorbing assembly 150 may extend between a first end 162 and a second end 164. Open portions 160 may be defined at one or both of the first end 162 and the second end 164. When the open portion 160 is present at a bumper side, the cross-sectional area of the energy-absorbing assembly 150 is reduced, thereby reducing a peak force to initiate crush. The open portion 160 may be present at the vehicle rail side because a portion of the energy-absorbing assembly 150 at the vehicle rail side is inserted into the body structure and is therefore not available for energy absorption.

Figure 5:
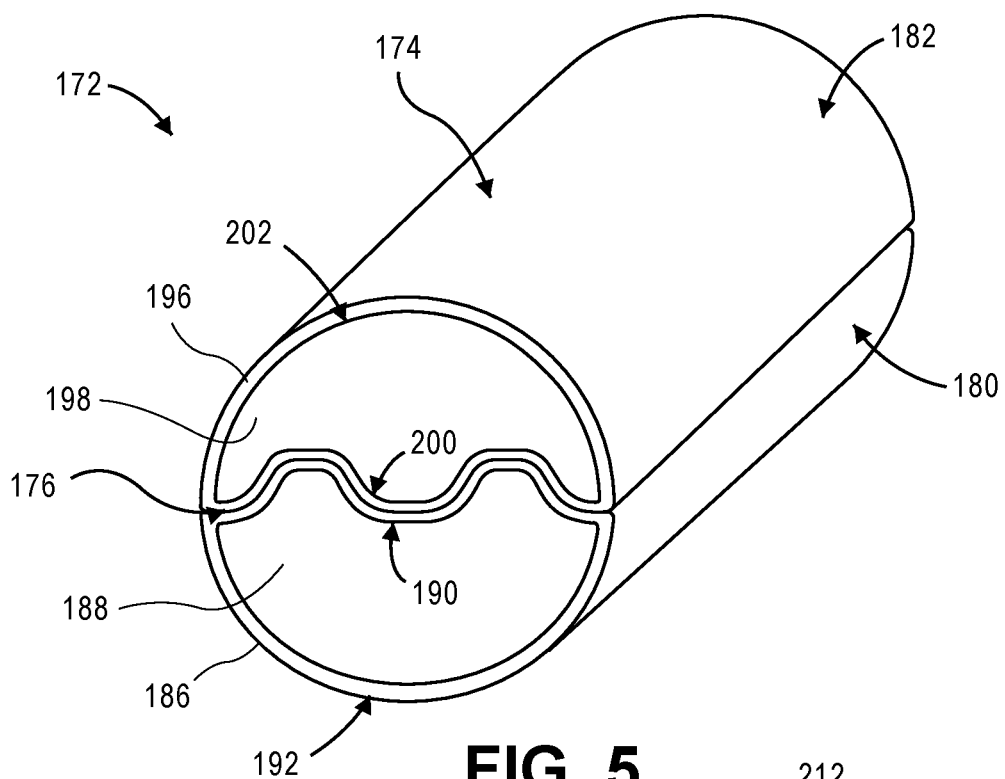
FIG. 5 is a perspective view of yet another energy-absorbing assembly having a circular cross section according to certain aspects of the present disclosure.

Referring to FIG. 5, yet another energy-absorbing assembly 172 according to certain aspects of the present disclosure is provided. The energy-absorbing assembly 172 may include an elongated tube 174 and a transverse plate 176. The energy-absorbing assembly 172 may further include a first component 180 and a second component 182.

The first component 180 may include a first peripheral wall 186 defining a first interior compartment or cell 188. The first peripheral wall 186 may include a first interior portion 190 and a first exterior portion 192. The first interior portion 190 may be similar to the first interior portion 56 of the first component 36 of FIG. 2. The first exterior portion 192 may have a semi-circular cross section.

The second component 182 may include a second peripheral wall 196 defining a second interior compartment or cell 198. The second peripheral wall 196 may include a second interior portion 200 and a second exterior portion 202. The second interior portion 200 may be similar to the second interior portion 88 of the second component 38 of FIG. 2. The exterior portion 202 may have a semi-circular cross section.

The first and second interior portions 190, 200 may cooperate to define the transverse plate 176. The first and second exterior portions 192, 202 may cooperate to define the elongated tube 174. The elongated tube 174 may have a substantially circular cross section. Other round or oval cross-sectional shapes are also contemplated in alternative variations.

Figure 6:
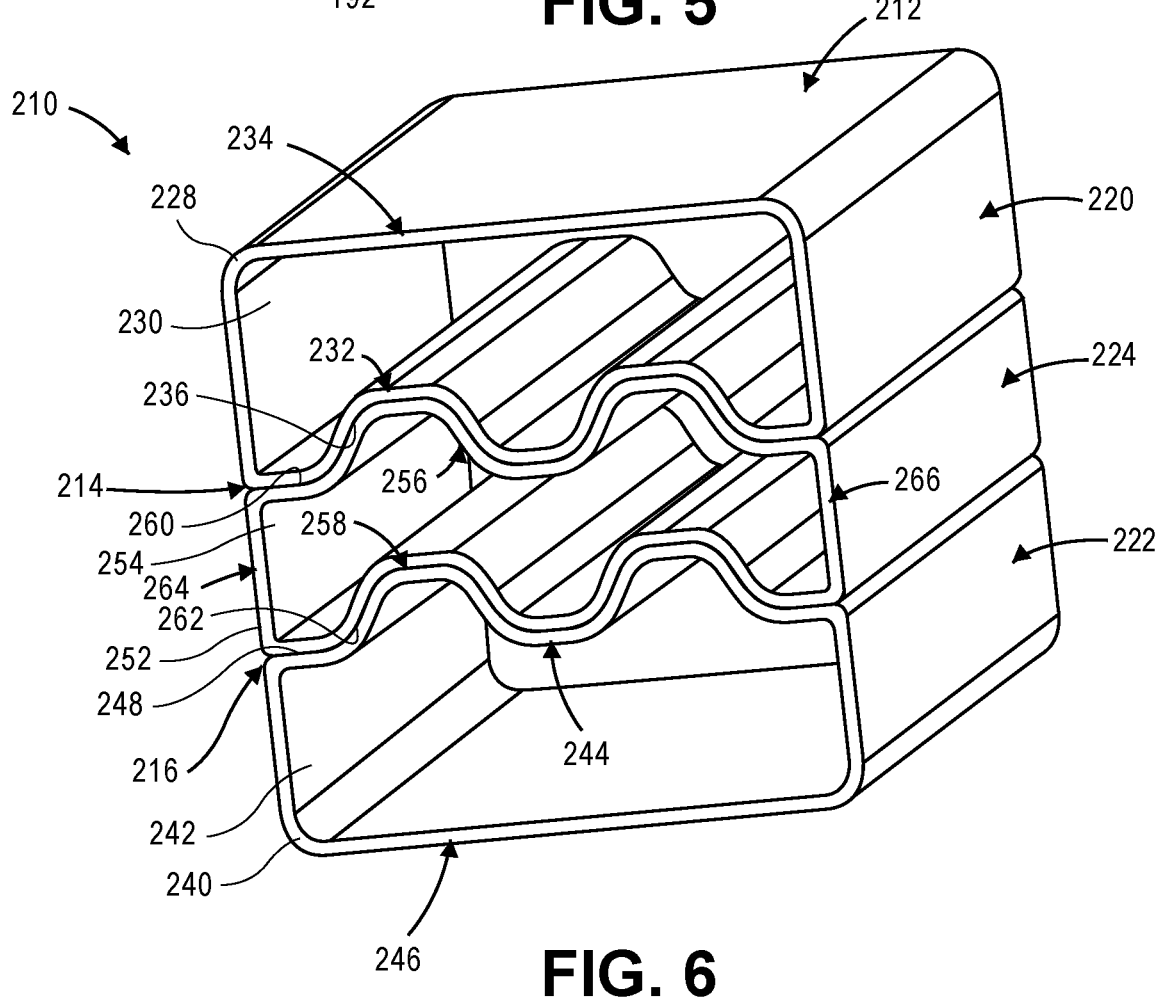
FIG. 6 is a perspective view of yet another energy-absorbing assembly having three components according to certain aspects of the present disclosure.

In various aspects, an energy-absorbing assembly according to certain aspects of the present disclosure may include more than two components. With reference to FIG. 6, yet another energy-absorbing assembly 210 according to certain aspects of the present disclosure is provided. The energy-absorbing assembly 210 may include an elongated tube 212, a first transverse plate 214, and a second transverse plate 216. The first and second transverse plates 214, 216 may extend through the elongated tube 212. The first and second transverse plates 214, 216 may be substantially parallel to one another. The energy-absorbing assembly 210 may include a first component 220, a second component 222, and a third component 224.

The first component 220 may include a first peripheral wall 228 defining a first interior compartment or cell 230. The first peripheral wall 228 may include a first interior portion 232 and a first exterior portion 234. The first interior portion 232 may define a first corrugated surface 236 similar to the first corrugated surface 62 of the first component 36 of FIG. 2. The first exterior portion 234 may be similar to the first exterior portion 58 of the first component 36 of FIG. 2.

The second component 222 may include a second peripheral wall 240 defining a second interior compartment or cell 242. The second peripheral wall 240 may include a second interior portion 244 and a second exterior portion 246. The second interior portion 244 may define a second corrugated surface 248 similar to the second corrugated surface 96 of the second component 38 of FIG. 2. The second exterior portion 246 may be similar to the second exterior portion 90 of the second component 38 of FIG. 2.

The third component 224 may be disposed between the first component 220 and the second component 222. The third component 224 may include a third peripheral wall 252 defining a third interior compartment 254. The third peripheral wall 252 may include a third interior portion 256 and a fourth interior portion 258. The third interior portion 256 may define a third corrugated surface 260 and may be similar to the second interior portion 88 of the second component 38 of FIG. 2. The fourth interior portion 258 may define a fourth corrugated surface 262 and may be similar to the first interior portion 56 of the first component 36 of FIG. 2. The third peripheral wall 252 may further include a third exterior portion 264 and a fourth exterior portion 266. The third and fourth exterior 264, 266 portions may extend substantially parallel to one another between the third interior portion 256 and the fourth interior portion 258.

The third corrugated surface 260 may complement the first corrugated surface 236 and be joined to the first corrugated surface 236. Thus, the first interior portion 232 and the third interior portion 256 may cooperate to define the first transverse plate 214. The fourth corrugated surface 262 may complement the second corrugated surface 248 and be joined to the second corrugated surface 248. Thus, the second interior portion 244 and the fourth interior portion 258 may cooperate to define the second transverse plate 216. The first, second, third, and fourth exterior portions 234, 246, 264, 266 may cooperate to define the elongated tube 212. The elongated tube 212 may have a substantially rectangular cross section.

Figure 7:
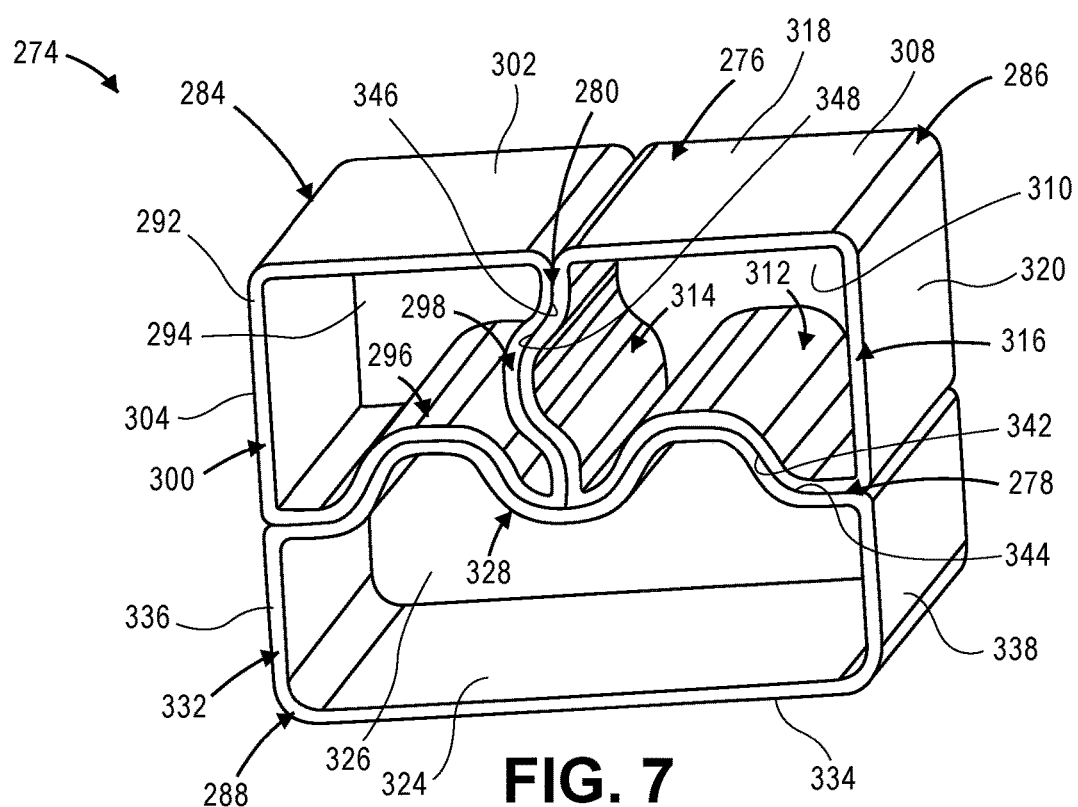
FIG. 7 is a perspective view of still another energy-absorbing assembly having three components according to certain aspects of the present disclosure.

Referring to FIG. 7, yet another energy-absorbing assembly 274 according to certain aspects of the present disclosure is provided. The energy-absorbing assembly 274 may include an elongated tube 276 a first transverse plate 278, and a second transverse plate 280. The first and second transverse plates 278, 280 may be substantially perpendicular to one another (e.g., when the transverse plates 278, 280 define waveforms, the respective centerlines are substantially perpendicular). The energy-absorbing assembly 274 may include a first component 284, a second component 286, and a third component 288.

The first component 284 may include a first peripheral wall 292 defining a first interior compartment 294 or cell. The first peripheral wall 292 may include a first interior portion 296, a second interior portion 298, and a first exterior portion 300. The first and second interior portions 296, 298 may be substantially perpendicular to one another. The first exterior portion 300 may include a first wall 302 and a second wall 304 substantially perpendicular to the first wall 302. The first wall 302 may be disposed opposite the first interior portion 296. The second wall 304 may be disposed opposite the second interior portion 298.

The second component 286 may include a second peripheral wall 308 defining a second interior compartment or cell 310. The second peripheral wall 308 may include a third interior portion 312, a fourth interior portion 314, and a second exterior portion 316. The third and fourth interior portions 312, 314 may be substantially perpendicular to one another. The second exterior portion 316 may include a third wall 318 and a fourth wall 320 substantially perpendicular to the third wall 318. The third wall 318 may be disposed opposite the third interior portion 312 and the fourth wall 320 may be disposed opposite the fourth interior portion 314.

The third component 288 may include a third peripheral wall 324 defining a third interior compartment or cell 326. The third peripheral wall 324 may include a fifth interior portion 328 and a third exterior portion 332. The exterior portion 332 may include a fifth wall 334, a sixth wall 336, and a seventh wall 338. The fifth wall 334 may be disposed opposite the fifth interior portion 328. The sixth wall 336 and the seventh wall 338 may extend substantially parallel to one another between the fifth interior portion 328 and the fifth wall 334. The sixth wall 336 may be disposed opposite the seventh wall 338.

The first interior portion 296 and the third interior portion 312 may cooperate to define a first corrugated surface 342. The fifth interior portion 328 may define a second corrugated surface 344 that complements the first corrugated surface 342. The first and second corrugated surfaces 342, 344 may be fixed to one another. Thus, the first, third, and fifth interior portions 296, 312, 328 may cooperate to define the first transverse plate 278. The second interior portion 298 may define a third corrugated surface 346. The fourth interior portion 314 may define a fourth corrugated surface 348 that complements the second corrugated surface 344. The second corrugated surface 344 may be joined to the fourth corrugated surface 348. Thus, the second and fourth interior portions 298, 314 may cooperate to define the second transverse plate 280. The first, second, and third exterior portions 300, 316, 332 may cooperate to define the elongated tube 276. The elongated tube 276 may have a substantially rectangular cross section.

With reference to FIG. 8, yet another energy-absorbing assembly 356 according to certain aspects of the present disclosure is provided. The energy-absorbing assembly 356 may include an elongated tube 358, a first transverse plate 360, and a second transverse plate 362. The first and second transverse plates 360, 362 may be substantially perpendicular to one another (e.g., when the transverse plates define a waveform, the respective centerlines of the interior portions of the components are substantially perpendicular to one another). The energy-absorbing assembly 356 may include a first component 366, a second component 368, a third component 370, and a fourth component 372.

The first component 366 may include a first peripheral wall 374 defining a first interior compartment 376 or cell. The first peripheral wall 374 may include a first interior portion 378, a second interior portion 380, and a first exterior portion 382. The first and second interior portions 378, 380 may be substantially perpendicular to one another. The first exterior portion 382 may include a first wall 384 and a second wall 386 substantially perpendicular to the first wall 384. The first wall 384 may be disposed opposite the first interior portion 378. The second wall 386 may be disposed opposite the second interior portion 380.

The second component 368 may include a second peripheral wall 390 defining a second interior compartment 392 or cell. The second peripheral wall 390 may include a third interior portion 394, a fourth interior portion 396, and a second exterior portion 398. The third and fourth interior portions 394, 396 may be substantially perpendicular to one another. The second exterior portion 398 may include a third wall 400 and a fourth wall 402 substantially perpendicular to the third wall 400. The third wall 400 may be disposed opposite the third interior portion 394 and the fourth wall 402 may be disposed opposite the fourth interior portion 396.

The third component 370 may include a third peripheral wall 406 defining a third interior compartment or cell 408. The third peripheral wall 406 may include a fifth interior portion 410, a sixth interior portion 412, and a third exterior portion 414. The fifth and sixth interior portions 410, 412 may be disposed substantially perpendicular to one another. The third exterior portion 414 may include a fifth wall 416 and a sixth wall 418 substantially perpendicular to the fifth wall 416. The fifth wall 416 may be disposed opposite the fifth interior portion 410 and the sixth wall 418 may be disposed opposite the sixth interior portion 412.

The fourth component 372 may include a fourth peripheral wall 422 defining a fourth interior compartment or cell 424. The fourth peripheral wall 422 may include a seventh interior portion 426, an eighth interior portion 428, and a fourth exterior portion 430. The seventh and eighth interior portions 426, 428 may be disposed substantially perpendicular to one another. The fourth exterior portion 430 may include a seventh wall 432 and an eighth wall 434 disposed substantially perpendicular to the seventh wall 432. The seventh wall 432 may be disposed opposite the seventh interior portion 426 and the eighth wall 434 may be disposed opposite the eighth interior portion 428.

The first interior portion 378 and the third interior portion 394 may cooperate to define a first corrugated surface 438. The fifth interior portion 410 and the seventh interior portion 426 may cooperate to define a second corrugated surface 440. The first and second corrugated surfaces 438, 440 may be fixed to one another. Thus, the first, third, fifth, and seventh interior portions 378, 394, 410, 426 may cooperate to define the first transverse plate 360. The second interior portion 380 and the sixth interior portion 412 may cooperate to define a third corrugated surface 442. The fourth interior portion 396 and the eighth interior portion 428 may cooperate to define a fourth corrugated surface 444. The third and fourth corrugated surfaces 442, 444 may be fixed to one another. Thus, the second, fourth, sixth, and eighth interior portions 380, 396, 412, 428 may cooperate to define the second transverse plate 362. The first, second, third, and fourth exterior portions 382, 398, 414, 430 may cooperate to define the elongated tube 358. The elongated tube 358 may have a substantially rectangular cross section.

The energy-absorbing assemblies discussed above may be selected from the group consisting of: a pillar, a structural panel, a suspension component, a crush can, a bumper beam, a structural front rail, a structural frame, a cross car beam, an undercarriage component, and combinations thereof. Although automotive applications are discussed, the energy-absorbing assembly may also be used in other applications such as other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like.

In various aspects, the present disclosure provides a method of manufacturing an energy-absorbing assembly according to certain aspects of the present disclosure. The method will be described in the context of the energy-absorbing assembly 30 of FIG. 2; however, the method is also applicable to any of the other energy-absorbing assemblies of the present disclosure. Referring to FIGS. 9A-9E, an example method of forming the energy-absorbing assembly 30 includes compression molding.

In FIG. 9A, a mold 450 including a male portion 452 and a female portion 454 is provided. The male portion 452 may include a base 456 and a negative form 458. The negative form 458 may be shaped like the first interior compartment 52 of the first component 36. A longitudinal mold axis 460 may extend through a center of the negative form 458. The longitudinal mold axis 460 is configured to be aligned with the first longitudinal axis 54 of the first component 36. The male portion 452 may include a draft angle 462 to facilitate removal of the part. The draft angle 462 may be greater than or equal to about 0.5°, optionally greater than or equal to about 0.5° and less than or equal to about 10°, optionally greater than or equal to about 1° and less than or equal to about 8°, optionally greater than or equal to about 2° and less than or equal to about 5°, and optionally greater than or equal to about 3° and less than or equal to about 4°.

In FIG. 9B, a composite precursor sheet 466 may be wrapped around the negative form 458. A seam 468 may be disposed on a surface of the negative form 458 that corresponds to the outer wall 70 of the first component 36. The seam 468 may be parallel to the longitudinal axes 54, 460. An alternative seam 468' is shown. The alternative seam 468' extends non-parallel to the longitudinal axes 54, 460. By way of non-limiting example, the composite precursor sheet 466 may be an organo sheet.

In FIG. 9C, the female portion 454 of the mold 450 may be closed around the negative form 458 and the composite precursor sheet 466. The composite precursor sheet 466 may be consolidated by applying heat and pressure. In one non-limiting example, when the first component 36 includes fiber-reinforced nylon 6, a temperature of the mold 450 is about 150° C., a pressure of the mold is greater than or equal to about 10 MPa and less than or equal to about 25 MPa, and a duration of time in the mold 450 is greater than or equal to about 30 seconds and less than or equal to about 120 seconds. However, a person having ordinary skill in the art would understand that other process parameters may be selected based on the polymer used. At FIG. 9D, the first component 36 is removed from the mold 450. The second component 38 is formed in a similar method as described in FIGS. 9A-9D. However, a mold for forming the second component 38 has a complementary shape to the mold 450 for forming the first component 36.

At FIG. 9E, the first component 36 may be joined to the second component 38. The first and second components 36, 38 may be joined by a layer of adhesive disposed between the first corrugated surface 62 and the second corrugated surface 96. The adhesive may include a methacrylate adhesive (e.g., Plexus® MA530), a urethane adhesive (e.g., Ashland Pliogrip® 7770), or an epoxy adhesive (e.g., Magnobond® 56), by way of non-limiting example.

The adhesive may be applied to one or both of the first corrugated surface 62 and the second corrugated surface 96. The adhesive may cover greater than or equal to about 30% of the surface area of the corrugated surface, optionally greater than or equal to 70% of the surface area of the corrugated surface, optionally greater than or equal to 75% of the surface area of the corrugated surface, optionally greater than or equal to 80% of the surface area of the corrugated surface, optionally greater than or equal to 85% of the surface area of the corrugated surface, optionally greater than or equal to 90% of the surface area of the corrugated surface, optionally greater than or equal to 95% of the surface area of the corrugated surface, and optionally greater than or equal to 99% of the surface area of the corrugated surface. The adhesive may be cured. The adhesive may be cured at a temperature of greater than or equal to about 0° C. and less than or equal to about 250° C., and optionally about 100° C. The adhesive curing process may have a duration of greater than or equal to about 10 minutes to less than or equal to about 24 hours, and optionally about 1 hour. In addition to or in place of the adhesive, the first and second components 36, 38 may be joined by a plurality of mechanical fasteners (e.g., screws, rivets, bolts). Alternatively, when the first composite and the second composite include thermoplastic polymers, the first and second components 36, 38 may be joined by welding (e.g., vibration, ultrasonic).

A person having skill in the art would appreciate that the energy-absorbing assembly 30 could be formed by other methods. For example, the energy-absorbing assembly 30 (and any of the other energy-absorbing assembly described herein) could be formed by vacuum bagging, autoclave, open molding, resin infusion (e.g., resin transfer molding (RTM), resin injection molding (RIM), high-pressure resin transfer molding (HP-RTM), compression resin transfer molding (C-RTM)), vacuum assisted resin transfer molding (VARTM), resin film infusion (RFI), injection molding, pultrusion, automated fiber placement (AFP), and automated tape layering (ATL).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An energy-absorbing assembly for a vehicle comprising:
a first component comprising a first polymer and a first plurality of reinforcing fibers, the first component comprising a first peripheral wall defining a first interior compartment having a first longitudinal axis extending therethrough, a first interior portion of the first peripheral wall comprising a first plurality of elongate ridges formed therein, wherein each respective elongate ridge of the first plurality of elongate ridges extends substantially parallel to the first longitudinal axis and is spaced apart from adjacent elongate ridges of the first plurality of elongate ridges at predetermined intervals to form a first corrugated surface;
a second component comprising a second polymer and a second plurality of reinforcing fibers, the second component comprising a second peripheral wall defining a second interior compartment having a second longitudinal axis extending therethrough, a second interior portion of the second peripheral wall comprising a second plurality of elongate ridges formed therein, wherein each respective elongate ridge of the second plurality of elongate ridges extends substantially parallel to the second longitudinal axis and is spaced apart from adjacent elongate ridges of the second plurality of elongate ridges at predetermined intervals to form a second corrugated surface, wherein the first corrugated surface is complementary to the second corrugated surface, and the first corrugated surface is joined to the second corrugated surface; and
an adhesive layer disposed directly between the first corrugated surface and the second corrugated surface to fix the first component to the second component.

2. The energy-absorbing assembly of claim 1, wherein:
the first peripheral wall further includes a first exterior wall and a first interior wall including the first interior portion;
the second peripheral wall further includes a second exterior wall and a second interior wall including the second interior portion;
the first exterior wall and the second exterior wall cooperate to define an elongated tube; and
the first interior wall and the second interior wall cooperate to define a transverse plate, the transverse plate extending through the elongated tube substantially parallel to the first longitudinal axis and the second longitudinal axis.

3. The energy-absorbing assembly of claim 1, wherein the first plurality of elongate ridges and the second plurality of elongate ridges each have a generally periodic profile.

4. The energy-absorbing assembly of claim 1, wherein:
the first interior portion of the first peripheral wall has a first length in a direction substantially parallel the first longitudinal axis;
a first exterior portion of the first peripheral wall has a second length in the direction, the second length being greater than the first length;
the second interior portion of the second peripheral wall has the first length in the direction; and
a second exterior portion of the second peripheral wall has the second length in the direction.

5. The energy-absorbing assembly of claim 1, wherein:
the first peripheral wall comprises a first outer wall, first opposing side walls extending substantially perpendicular to the first outer wall, and a first inner wall including the first interior portion of the first peripheral wall, the first inner wall being disposed opposite the first outer wall and extending between the first opposing side walls;
the second peripheral wall comprises a second outer wall, second opposing side walls extending substantially perpendicular to the second outer wall, and a second inner wall including the second interior portion of the second peripheral wall, the second inner wall being disposed opposite the second outer wall and extending between the second opposing side walls; and
the first outer wall, the first opposing side walls, the second outer wall, and the second opposing side walls cooperate to define a substantially rectangular cross section in a direction substantially perpendicular to the first longitudinal axis and the second longitudinal axis.

6. The energy-absorbing assembly of claim 1, wherein the first polymer and the second polymer are thermoset polymers independently selected from the group consisting of: benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-polymers thereof, and combinations thereof.

7. The energy-absorbing assembly of claim 1, wherein the first polymer and the second polymer are thermoplastic polymers independently selected from the group consisting of: polyethylenimine (PEI), polyamide-imide (PAI), polyamide (PA) (e.g., nylon 6, nylon 66, nylon 12), polyetheretherketone (PEEK), polyetherketone (PEK), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), polycarbonate (PC), polyaryletherketone (PAEK), polyetherketoneketone (PEKK), co-polymers thereof, and combinations thereof.

8. The energy-absorbing assembly of claim 1, wherein the first plurality of reinforcing fibers and the second plurality of reinforcing fibers are independently selected from the group consisting of: carbon fibers, glass fibers, basalt fibers, para-aramid fibers, meta-aramid fibers, polyethylene fibers, and natural fibers.

9. The energy-absorbing assembly of claim 1, wherein:
the first peripheral wall has a first thickness of greater than or equal to about 1 mm and less than or equal to about 8 mm; and
the second peripheral wall has a second thickness of greater than or equal to about 1 mm and less than or equal to about 8 mm.

10. The energy-absorbing assembly of claim 9, wherein:
a first of ratio of a first height to the first thickness of the elongate ridges of the first plurality of elongate ridges is greater than or equal to about 1 and less than or equal to about 20; and
a second ratio of a second height to the second thickness of the elongate ridges of the second plurality of elongate ridges is greater than or equal to about 1 and less than or equal to about 20.

11. The energy-absorbing assembly of claim 1, further comprising:
a third component comprising a third polymer and a third plurality of reinforcing fibers, the third component comprising a third peripheral wall defining a third interior compartment having a third longitudinal axis extending therethrough, a third interior portion of the third peripheral wall comprising a third plurality of elongate ridges formed therein, wherein each respective elongate ridge of the third plurality of elongate ridges extends substantially parallel to the third longitudinal axis and is spaced apart from adjacent elongate ridges of the third plurality of elongate ridges at predetermined intervals to form a third corrugated surface, wherein:
at least one of the first component and the second component includes a fourth corrugated surface;
the third corrugated surface is complementary to the fourth corrugated surface; and
the third corrugated surface is joined to the fourth corrugated surface.

12. The energy-absorbing assembly of claim 1, wherein the energy-absorbing assembly is selected from the group consisting of: a pillar, a structural panel, a suspension component, a crush can, a bumper beam, a structural front rail, a structural frame, a cross car beam, an undercarriage component, and combinations thereof.

13. The energy-absorbing assembly of claim 1, wherein the first polymer and the second polymer are the same.

14. The energy-absorbing assembly of claim 1, wherein a first plurality of floors is disposed between the first plurality of elongate ridges and a second plurality of floors is disposed between the second plurality of elongate ridges.

15. The energy-absorbing assembly of claim 14, wherein each elongate ridge of the first plurality of elongate ridges and each elongate ridge of the second plurality of elongate ridges comprises a top wall and two side walls.

16. The energy-absorbing assembly of claim 15, wherein:
a plane extends substantially perpendicular to the first plurality of floors and the second plurality of floors; and
a corrugation angle is formed between the plane and each side wall, the corrugation angle being greater than or equal to about 30° and less than or equal to about 70°.

17. An energy-absorbing assembly for a vehicle comprising:
a first component comprising a first polymer and a first plurality of reinforcing fibers, the first component comprising a first peripheral wall defining a first interior compartment having a first longitudinal axis extending therethrough, a first interior portion of the first peripheral wall comprising a first plurality of elongate ridges formed therein, wherein each respective elongate ridge of the first plurality of elongate ridges extends substantially parallel to the first longitudinal axis and is spaced apart from adjacent elongate ridges of the first plurality of elongate ridges at predetermined intervals to form a first corrugated surface; and
a second component comprising a second polymer and a second plurality of reinforcing fibers, the second component comprising a second peripheral wall defining a second interior compartment having a second longitudinal axis extending therethrough, a second interior portion of the second peripheral wall comprising a second plurality of elongate ridges formed therein, wherein each respective elongate ridge of the second plurality of elongate ridges extends substantially parallel to the second longitudinal axis and is spaced apart from adjacent elongate ridges of the second plurality of elongate ridges at predetermined intervals to form a second corrugated surface, wherein:

the first corrugated surface is complementary to the second corrugated surface, and the first corrugated surface is joined to the second corrugated surface;

a first plurality of floors is disposed between the first plurality of elongate ridges and a second plurality of floors is disposed between the second plurality of elongate ridges;

a plane extends substantially perpendicular to the first plurality of floors and the second plurality of floors;

each elongate ridge of the first plurality of elongate ridges and each elongate ridge of the second plurality of elongate ridges comprises a top wall and two side walls; and a corrugation angle is formed between the plane and each side wall, the corrugation angle being greater than or equal to about 30° and less than or equal to about 70°.

18. A method of manufacturing an energy-absorbing assembly for a vehicle comprising:

forming a first component from a first composite sheet comprising a first polymer resin and a first plurality of reinforcing fibers, the first component comprising a first peripheral wall defining a first interior compartment having a first longitudinal axis extending therethrough, a first interior portion of the first peripheral wall comprising a first plurality of elongate ridges formed therein, wherein each respective elongate ridge of the first plurality of elongate ridges extends substantially parallel to the first longitudinal axis and is spaced apart from adjacent elongate ridges of the first plurality of elongate ridges at predetermined intervals to form a first corrugated surface;

forming a second component from a second composite sheet comprising a second polymer resin and a second plurality of reinforcing fibers, the second component comprising a second peripheral wall defining a second interior compartment having a second longitudinal axis extending therethrough, a second interior portion of the second peripheral wall comprising a second plurality of elongate ridges formed therein, wherein each respective elongate ridge of the second plurality of elongate ridges extends substantially parallel to the second longitudinal axis and is spaced apart from adjacent elongate ridges of the second plurality of elongate ridges at predetermined intervals to form a second corrugated surface, the second corrugated surface being complementary to the first corrugated surface; and joining the first corrugated surface to the second corrugated surface to form the energy-absorbing assembly, wherein:

the forming the first component includes compression molding the first component, and the compression molding the first component includes wrapping the first composite sheet around a first male mold, the first male mold including a first mold surface and a second mold surface opposite the first mold surface and defining the first plurality of elongate ridges, a first seam of the first composite sheet being disposed on the first mold surface; and the forming the second component includes compression molding the second component and the compression molding the second component includes wrapping the second composite sheet around a second male mold, the second male mold including a third mold surface and a fourth mold surface opposite the third mold surface and defining the second plurality of elongate ridges, a second seam of the second composite sheet being disposed on the third mold surface.

19. The method of claim 18, wherein the joining the first corrugated surface to the second corrugated surface comprises applying adhesive to at least one of the first corrugated surface and the second corrugated surface and curing the adhesive.

20. The method of claim 18, wherein:

the first seam of the first composite sheet extends non-parallel to the first longitudinal axis; and the second seam of the second composite sheet extends non-parallel to the second longitudinal axis.

* * * * *